May 15, 1962 H. R. TUCK ETAL 3,034,221
CLOTHES DRIER HAVING ABSORBENT BED
Filed Oct. 11, 1957 4 Sheets-Sheet 1

INVENTORS
HARVEY R. TUCK
JAMES L. MILLER
BY Edwin S. Dybvig
THEIR ATTORNEY

May 15, 1962 H. R. TUCK ETAL 3,034,221
CLOTHES DRIER HAVING ABSORBENT BED
Filed Oct. 11, 1957 4 Sheets-Sheet 3

INVENTORS
HARVEY R. TUCK
JAMES L. MILLER
BY Edwin S. Dybvig
THEIR ATTORNEY

United States Patent Office

3,034,221
Patented May 15, 1962

3,034,221
CLOTHES DRIER HAVING ABSORBENT BED
Harvey R. Tuck, Trotwood, and James L. Miller, Dayton, Ohio, assignors to General Motors Corporation, Detroit, Mich., a corporation of Delaware
Filed Oct. 11, 1957, Ser. No. 689,570
4 Claims. (Cl. 34—45)

This invention relates to domestic appliances, and more particularly to an apparatus for removing moisture from clothes.

With conventional clothes dryers which utilize heat to evaporate the water from the wet clothes, approximately 1,000 B.t.u.'s are required per pound of water evaporated. With this energy requirement and the power limitation on a 115-volt dryer, even a 100% efficient drying unit requires an undesirably long drying time. In order to circumvent this problem, this invention proposes to supplement the heat supplied electrically with the heat evolved during an adsorption process that has been adapted to the clothes drying cycle of this invention. Utilizing this approach, drying time required by conventional dryers has been decreased up to 40%.

By way of background, adsorption is a process whereby air is dehydrated when it is brought into contact with an adsorbent or hygroscopic material. An adsorbent, such as silica gel, is a solid substance capable of taking up or adsorbing a liquid or vapor by the physical action of its submicroscopic pores. During the adsorption process a heat of wetting is released in addition to the latent heat of condensation, a physical phenomenon which may be incorporated to advantage in providing additional heating capacity in a clothes dryer limited to a 115-volt circuit. After moisture has been adsorbed to the fullest extent, i.e. the adsorbent has taken up as much water as it can hold, a regenerative process is required to drive off the moisture adsorbed. Regeneration may be accomplished in between clothes drying loads. Desorption of vapor from an adsorbent will take place with a reverse of the adsorbing conditions, i.e. the heat of wetting will be taken up by the adsorbent as the moisture is removed. Therefore, regeneration necessitates the passing of heated air through the adsorbent bed.

Accordingly, it is an object of this invention to apply the adsorption principle to a conventional clothes drying circuit; to provide a clothes drying system whereby the clothes are dried in a conventionally operated tumbling drum in series with an adsorbent for removing the moisture entrained in the air during the clothes drying process; to further provide means for regenerating or reactivating the adsorbent after any given number of drying cycles; to provide a discharge conduit or vent of comparatively small size for removing the moisture from the dryer during the regeneration process; to provide a novel clutching arrangement for the clothes tumbling drum of the dryer whereby the drum does not rotate during the regeneration process; and to provide this system with a lint collector and means for eliminating the lint so collected.

Other objects and advantages will appear from the following description when read in conjunction with the accompanying drawings in which.

Figure 1:
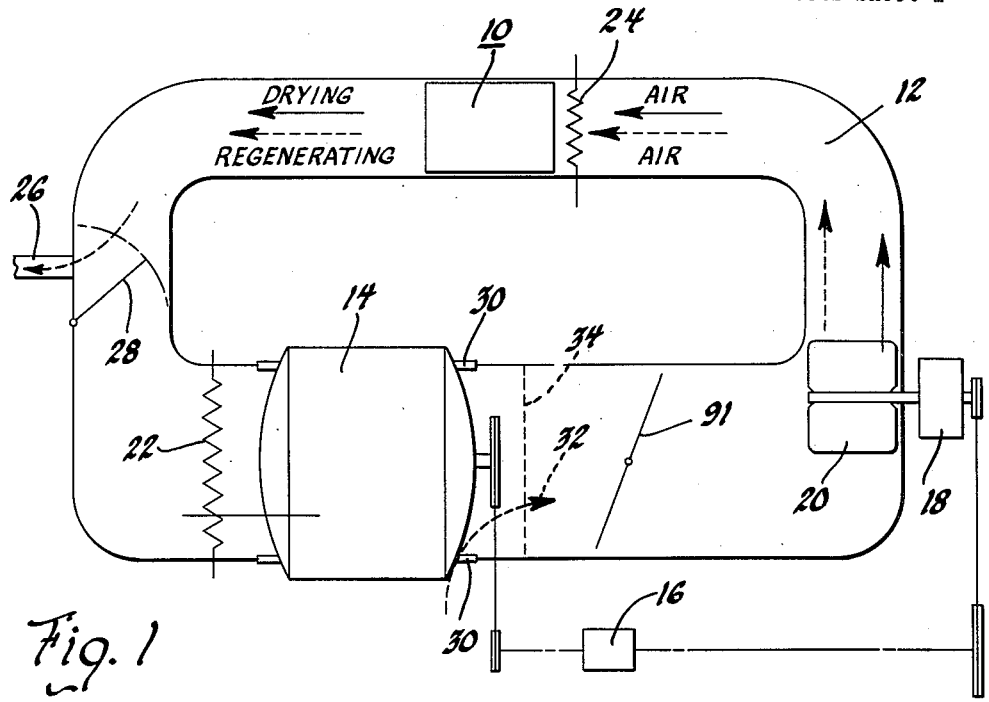
FIGURE 1 is a schematic representation of the closed circuit drying system of this invention incorporating the adsorbent process and means for regeneration.

With reference to schematic FIG. 1, a clothes dryer, according to my invention, may incorporate an adsorbent bed 10 interposed in the air flow path of a closed circuit 12 to collect moisture entrained in the air as it passes through a tumbling drum 14 rotated through a clutching arrangement 16 by fan motor 18. The air is circulated by impeller 20 from the tumbling drum 14 to the adsorbent bed 10 and back to the tumbling drum. During the clothes drying cycle, the primary source of heat is electric heater 22. However, additional heat is released in the adsorption process at 10 which is added to the circulating air and utilized to speed the clothes drying process.

When the dryer is not in use, the adsorbent bed 10 may be regenerated by circulating therethrough a reduced amount of relatively dry air heated by regenerative heater 24 to a temperature of approximately 300° F. This heated dry air releases the moisture from the adsorbent for discharge through conduit 26 to the outside. Bypass damper 28 is opened to permit this discharge during the regenerative process. Air supply to offset the amount exhausted may be admitted by way of leakage past the felt seals 30 of the tumbling drum and is indicated generally by air flow arrow 32.

Since the amount of air required during regeneration is less than that found necessary in the clothes drying process, vent 26 may be made considerably smaller than the 3 and 4-inch vents installed on conventional dryers. In this regard, a vent 26 having a diameter of 1 to 1½ inches has proved satisfactory.

This system may also be provided with a lint collector or combination lint collector and burner 34 of the type described in copending application S.N. 635,635, filed January 23, 1957. During the reactivation of the adsorbent, motor 18 and impeller 20 are reversed to provide a reduced air flow through the adsorbent. This reduced flow thus makes possible the use of a relatively small vent or discharge conduit 26, as aforesaid. A slip clutch 16 of the coil spring type prevents the tumbling drum from rotating during the regeneration process.

Figure 3:
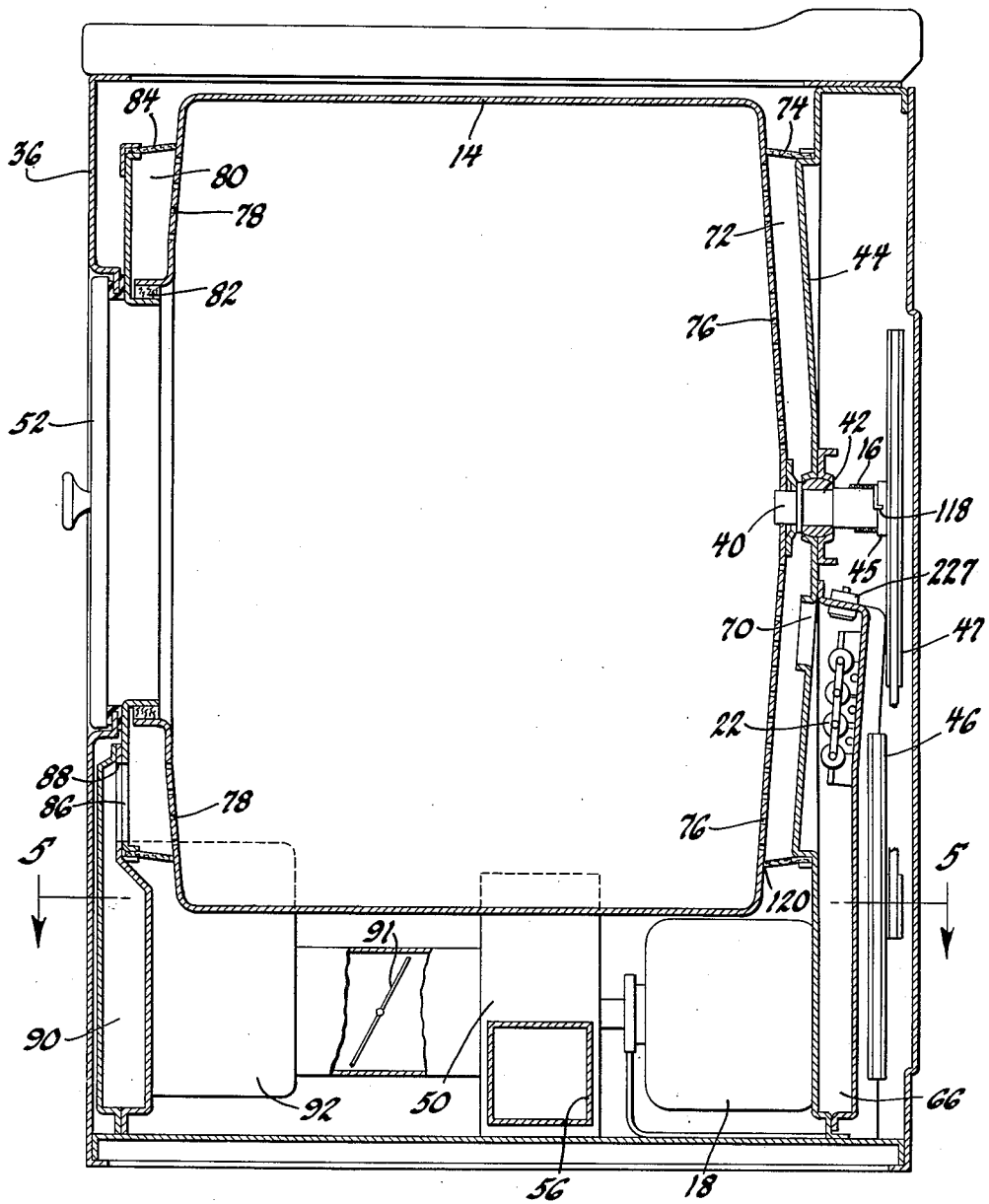
FIGURE 3 is a sectional view taken substantially along line 3—3 of FIGURE 4.
Figure 4:
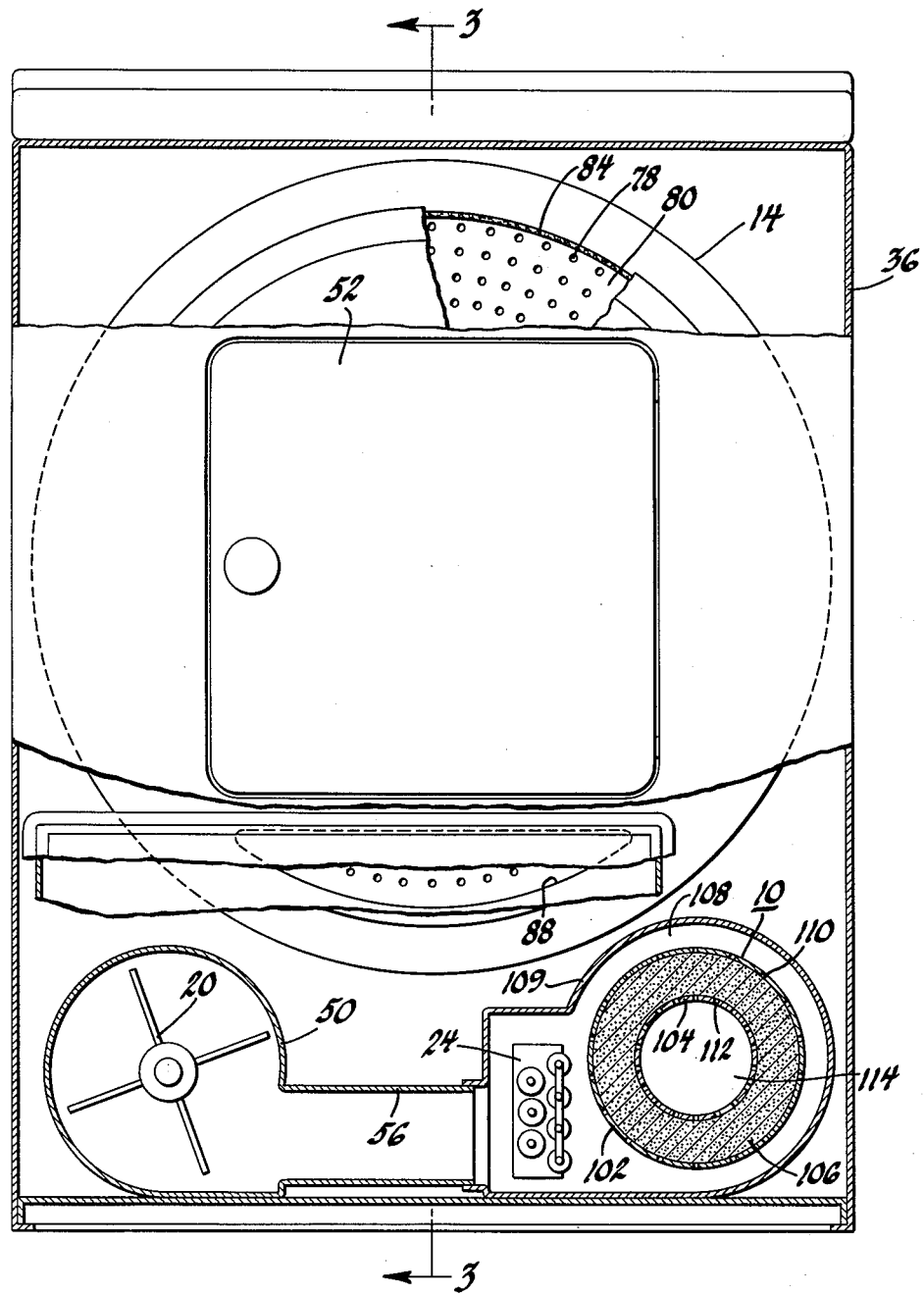
FIGURE 4 is a front view of the dryer of this invention, with parts broken away, to illustrate the adsorbent bed and its regenerative heater.

An embodiment of a conventional dryer equipped with the novel drying process of this invention is best seen in FIGS. 3 and 4 wherein a dryer cabinet 36 encloses a tumbling drum 14 rotatably mounted on shaft 40, journalled at 42 on support panel 44. The drum is rotated through a pulley arrangement shown generally at 46 by a motor 18 which also drives a fan or blower 50 to circulate air about a closed circulating system. An access door 52 is provided in the cabinet 36 for introducing clothes into the tumbling drum 14.

Figure 5:
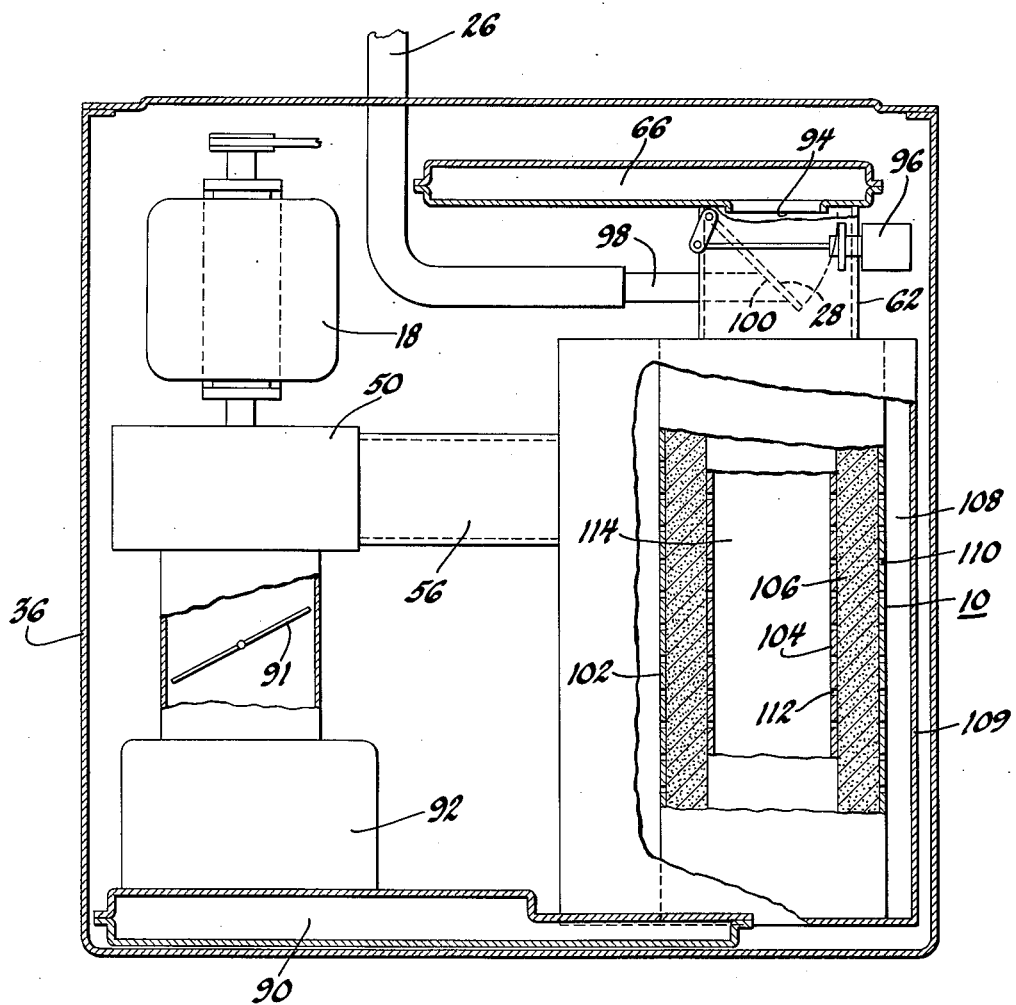
FIGURE 5 is a sectional view taken substantially along lines 5—5 of FIGURE 3 and showing the relatively small vent made possible through the use of this invention.

Starting with the blower or fan 50, the path of air flow through the dryer will now be more fully described. A paddle-wheel type of impeller 20 driven by motor 18 forces air through conduit 56 past regeneration heater 24 and into the absorbent bed shown generally at 10. From the adsorbent bed the air passes through conduit 62 past the damper 28 and into rear duct 66 (FIG. 5). Air rises past electric heaters 22 through an aperture 70 in the support panel 44 into an annular chamber 72 covering the rear of the tumbling drum 14 and closed about its periphery by seal 74. Apertures 76 in the rear wall of the drum provide air passage to the interior of the drum 14 while apertures 78 act as the exhaust openings therefrom. Annular chamber 80 sealed at its inner periphery by seal 82, and at its outer periphery by seal 84 receives the air flow as it comes from the tumbling drum and directs the air through an opening 86 in the front of this chamber adjacent to and in communication with a similar opening 88 in the rear wall of front duct 90. From duct 90, the air is passed by a burn damper 91 through a lint collector and burning arrangement, shown generally as a housing at 92, after which the air is returned to the blower 50.

During the regeneration process of the absorbent bed, damper 28 closes, opening 94 in rear duct 66 in response to the actuation of solenoid 96. In this relationship, conduit 98 is uncovered at 100 to receive the air passed over the adsorbent bed and to discharge the air by means of vent 26 to the atmosphere. The air flow during this operation will thus be impelled by blower 50 through conduit 56 to heater 24 where the air is heated before entering the adsorption bed 10 for the drying out process. As moisture is removed from the adsorbent, the saturated air is exhausted through conduit 98 to the outside.

Although an adsorbent bed of any configuration can be adapted to the invention here disclosed, one particular embodiment is illustrated in FIG. 4 wherein adsorbent bed 10 is comprised of an arrangement of concentric cylinders 102, 104. An absorbent such as silica gel is packed between these concentric cylinders as at 106. In determining the amount of adsorbent necessary, the adsorbing qualities of a particular adsorbent must be known. Silica gel, for example, can adsorb up to 35% of its weight. Therefore, approximately 9 pounds of water may be removed from the dryer air stream with 25 pounds of silica gel in bed 10. The air flow entering the absorbent bed through conduit 56 is directed about the annular passageway 108 between the casing 109 and cylinder 102. Apertures 110 in cylinder 102 provide access for circulation through the adsorbent while apertures 112 in cylinder 104 discharge this air into central conduit 114 in communication with duct 62. As the air carrying moisture from the clothes being dried is passed through the packed adsorbent 106, the moisture is adsorbed. Thus, comparatively dry air enters conduit 114 carrying with it the additional heat of condensation and heat of wetting picked up during the adsorption process. During regeneration of the adsorbent, the air follows the same path through the dryer, but the amount of air is substantially reduced. It is a feature of this invention that blower 50 will provide the necessary reduced air flow by merely reversing motor 18 and thus the interconnected impeller 20. By reversing the rotation of impeller 20 the efficiency of the blower is lowered and the output at 56 decreased during regeneration.

Since it has been found that a continuation of the tumbling operation after the clothes are dried greatly accelerates the wear on the clothes, it is a further feature of this invention to provide means whereby the tumbling operation or rotation of the drum may be interrupted during the regeneration process. To achieve this advantage, a conventional spring clutch 16 is secured to pulley hub 45 at 118 and adapted to grippingly engage shaft 40 only during the clothes drying process, in accordance with well known principles. When the motor 18 is reversed, pulleys 46 and 47 reverse as well. However, pulley 47 rotates freely on shaft 40 and drum 14 remains fixed due to the relaxing of spring clutch 16.

The regenerative process requires that the closed air circuit admit a quantity of air into the system equal to that discharged through conduit 98. For this purpose, it has been found that sufficient leakage occurs along the slidable connection 120 between seals 74, 84 and the rotating drum 14.

Figure 2:
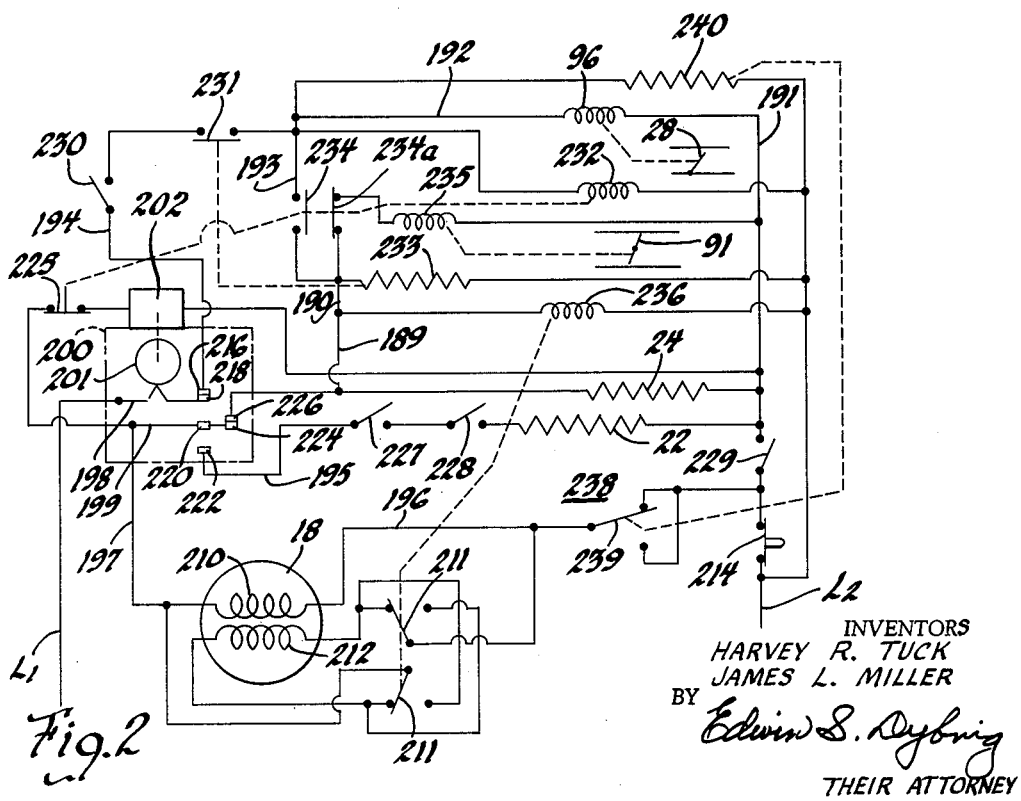
FIGURE 2 is a wiring diagram illustrating one means for effecting operation of this invention.

The sequence of operation for a preferred embodiment of this invention may best be understood with reference to the wiring diagram of FIG. 2 wherein the timer 200 is shown in both the "Off" and the "Regeneration" position. Elements previously illustrated in connection with FIGS. 1 and 2 will carry like numerals. To regulate the functions occurring during a complete dryer cycle, a timer 200 is provided with movable timer blades 198 and 199. Blade 198 receives power from $L_1$ and distributes this power through contact 218. Blade 199 carries contacts 220 and 224 and is biased downwardly by cam actuated blade 198. The cam 201 is driven by timer motor 202 to sequentially position blade 198 in one of three levels: an upper level, as in FIG. 2, for regeneration wherein contacts 218 and 216 are in communication; a middle level for lint burning wherein contact 218 meets contact 220; and a lower level for clothes drying wherein contact 218 forces blade 199 and contact 220 downwardly to contact 222, thus breaking contacts 224 and 226 which are made during all other dryer operations.

Dryer operation is under the control of a switch 214 which operates with access door 52 in the dryer cabinet. When door 52 is opened, the circuit through switch 214 is broken to prevent any dryer operation until the door is closed.

Power is provided for rotating tumbling drum 14 and driving fan impeller 20 by a reversible motor 18 having a running winding 210 and a starting winding 212. Reversing switches 211 are actuated by magnetic relay 236, and although these switches may be actuated at anytime solenoid 236 is energized, motor 18 must come to a complete stop before said actuation is effective to reverse the motor. Since the motor 18 is energized continuously during the drying-regeneration cycle, current flow to the motor 18 is interrupted by means of delay switch 238 to permit the motor to reverse at the start of regeneration. A suitable delay switch many comprise a bimetallic element 239 which is actuated by a heating coil 240 wound about the element.

Motor 18 is equipped with a centrifugal switch (not shown). During deceleration of motor 18 caused, for example, by the motor circuit interruption of delay switch 238, the centrifugal switch closes the circuit to the starter winding 212 which includes also the reversing switches 211. If the reversing switches have been actuated by solenoid 236 subsequent to the immediately preceding energization of the starter winding, such actuation will be effective to reverse the rotation of the motor.

The circuit for heating the air passing over the damp tumbling clothes is comprised of a main heater 22 in series with protection devices 227, 228 and 229. Temperature responsive safety switch 227 guards against insufficient air flow past the main heater 22 and is installed in the rear duct 66. If air flow is reduced below satisfactory limits, the temperature in compartment 66 will continue to rise. At the prescribed setting switch 227 will open the circuit to heater 22, thus preventing overheating. Control switch 228, also temperature responsive, is installed in front duct 70. If the dryer continues to operate after the clothes are dry, circulating air temperatures will tend to rise. At the prescribed high limit setting on the control switch 228, the circuit to the heater 22 will likewise be interrupted. Motor interlock switch 229 may be included in the system to assure that motor 18 is running before the heater circuits are energized. These safety devices, it should be understood, are merely precautionary measures incorporated into this dryer system and should not be construed as limitations to the novel concept here advanced.

The regeneration circuit includes a timer motor switch 225, a regeneration thermostat 230, an anti-recycling switch 231, a bypass damper solenoid 96, a motor reversing solenoid 236, a reversing delay switch heater coil 240 and regeneration heater 24. When the regeneration circuit is energized, solenoids 232 actuates switches 225 and 234a to deenergize the timer motor 202 and burn damper solenoid 235. Regeneration thermostat 230 is installed in discharge vent 26 and adapted to open with a rise in temperature of the air exhausted during the regeneration process. To understand the function of thermostat 230, it is desirable to restate the characteristics of the process used to remove moisture from an adsorbent. Heat is added to the air by regeneration heater 24 in advance of adsorbent bed 10. This heated air will tend to "boil off" the moisture hygroscopically retained in the adsorbent and will carry this moisture in the form of a latent load to exhaust vent 26. As the adsorbent "dries out," the latent load will decrease and be offset by an increase in the sensible load. Hence, air temperatures will rise to indicate a cessation of the regeneration process. This rise in temperature is sensed by thermostat 230 which deenergizes the entire regeneration circuit. Regeneration is generally complete when exhaust air reaches a temperature varying from 150°–200° F. It is obvious that thermostat 230 will again close when the air surrounding it cools. For this reason and to prevent a recycling of the regeneration process, thermally actuated switch 231 is placed in series with the thermostat. A suitable embodiment for switch 231 may include a bimetallic switch blade which is closed in advance of regeneration during the lint burning cycle (described hereinafter) by a heater coil 233. Thus, when thermostat 230 deenergizes the circuit, coil 233 will cool and bimetallic switch 231 will open. Then, as thermostat 230 cools and recloses, the regeneration circuit will remain open at switch 231.

To direct the moisture-laden air to vent 26 during regeneration, a solenoid 96 actuates bypass damper 28 to close the opening 94 in rear duct 66. Coincidentally, solenoid 232 opens the circuits to stop the timer motor 202 at switch 225, and opens the burn damper 91 at switch 234a and closes the circuit to the regenerative heater 24 at switch 234. Energized along with heater 24 is solenoid 236 for actuating motor reversing switches 211. Thermal actuator 233 for anti-cycling switch 231 had been made immediately preceding during the lint burning cycle (described hereinafter) and continues to be so energized during regeneration.

A clothes drying cycle may be initiated by placing damp clothes in drum 14 through access door 52 and turning cam 201 by way of a selection knob (not shown) associated therewith. Timer blade 198 will thus be cammed to its lower level and power motor 18 will be energized. After motor running speed is attained, current will flow from $L_1$, 198, 218, 220, 199, 197, motor 18, 196, 238, 214 to $L_2$. This circuit powers the tumbling action of drum 14 and air circulation by impeller 20. To heat the air, the main heater 22 is energized, current flowing, for this purpose, from $L_1$, 198, 218, 220, 222, 195, 227, 228, heater 22, 229, 214 to $L_2$. This operation will continue for the time interval selected so long as safety switches 227, 228 and 229 and door switch 214 remain closed.

At the termination of the clothes drying cycle the unit will automatically regenerate in accordance with timer operation. Where a lint burning feature is added, regeneration will be initiated automatically at the termination of the lint burning cycle. However, another load of clothes may be dried by resetting the timer for a drying operation in the same manner as described above. The number of loads which may be dried before regeneration becomes necessary is, of course, governed by the capacity of the adsorbent used in bed 10. If the cycle is permitted to progress automatically into regeneration, timer driven cam 201 will have permitted blade 198 to assume its upper level with contacts 218 and 216 in juxtaposition. Before this, however, blade 198 in its middle level will have energized a lint burning cycle (described hereinafter) during which time thermal coil 233 will have closed anti-cycling switch 231. With thermostat 230 cooled and in closed position power will flow from $L_1$, 198, 218, 216, 194, 230, 231, solenoid 232 to $L_2$. This circuit will cause solenoid 232 to close switch 234 and coincidentally to open switch 225 to interrupt timer motor operation, thereby placing the regeneration process under the termination control of thermostat 230.

The by-pass damper solenoid is energized from $L_1$, 198, 218, 216, 194, 230, 231, 192, solenoid 96, 191, safety switches 229 and 214 to $L_2$. Damper 28, by this circuit, will be placed in position to discharge air to the outside through vent 26.

During regeneration air flow is reduced from that found desirable in the clothes drying cycle. One means whereby air flow may be reduced is to reverse motor 18 to counterrotate impeller 20. Solenoid 236 is energized from 193, 234, 190, solenoid 236 to $L_2$ for the purpose of reversing switches 211. Where the motor 18 has been driving the drum 14 in a clothes drying operation a delay must be provided to allow the motor to stop so that a centrifugal switch can energize starting winding 212. For this purpose a switch 238 interrupts power flow to the motor 18 in accordance with the thermal actuation of coil 240.

With the motor 18 and impeller 20 in reverse and bypass damper 28 in position to discharge air to the outside, the regeneration process may proceed. Heater 24 is energized from $L_1$, 198, 218, 216, 194, 230, 231, 193, 234, 190, 189, heater 24, 229, 214 to $L_2$. The heated dry air is passed over the adsorbent bed, picking up moisture therefrom, until the regeneration of the adsorbent is completed as determined by thermostat 230. With thermostatic switch 230 and anti-recycling switch 231 open and timer blade 198 in its upper position, all dryer circuits are open and the complete drying-regenerating cycle finished.

This clothes dryer arrangement may be provided with a lint burning and smoke eliminating means of the general type shown in copending application Ser. No. 635,635, filed January 23, 1957. With reference to FIG. 1, a lint collector 34 is placed in the circulating air stream to trap lint evolved in the clothes drying process. After the drying cycle, burn damper 91 is closed to materially reduce air flow past collector screen 34. In this relationship heat is supplied to the screen in sufficient amount to burn the lint collected thereon.

As taught in the said copending application, the smoke and odor from the burning process is then eliminated. Temperatures necessary for burning the lint may be supplied by a heater in close association with the collector screen or by a heater 24 which, in this invention, furnishes the heating for both the lint burning and the regeneration process.

In the lint burning operation cam 201 urges blade 198 to its middle level to energize heater 24, anti-recycling switch actuator 233 and burn damper solenoid 235. In response to the action of solenoid 235 energized from $L_1$, 198, 218, 220, 224, 226, 189, 190, 234a, solenoid 235, 229, 214 to $L_2$, burn damper 91 is closed sufficiently to reduce air flow to approximately 2 c.f.m. Coincidently, heater 24 receives current from $L_1$, 198, 218, 220, 224, 226, heater 24, 229, 214 to $L_2$. The energy dissipated by heater 24 in conjunction with the reduced air flow raises the temperature at collector 34 to a point where the lint is burned. The safety switches 229 and 214 operate in the same manner as described hereinbefore.

During the lint burning, thermal actuator 233 is also energized to close anti-recycling switch 231. As the timer automatically terminates the lint burning cycle, the regeneration of the adsorbent is initiated, blade 198 moving to its upper level with contacts 216, 218 in juxtaposition. In this timer relationship thermal actuator 233 continues to energize switch 231 and burn damper solenoid 235 is deenergized. Therefore, the regeneration circuit is in condition for operation as governed by thermostat 230.

While the form of embodiment of the invention as herein disclosed constitutes a preferred form, it is to be understood that other forms might be adopted, as may come within the scope of the claims which follow.

What is claimed is as follows:

1. A clothes dryer including an outer cabinet, a vertical support panel in the rear of said cabinet and having an opening, a tumbling drum having a shaft journaled on said panel, said shaft connected to a one-way clutch for effecting unidirectional rotation of said drum in said cabinet, said tumbling drum having perforated front and rear walls and an imperforate peripheral wall, means for partially sealing between said support panel and said drum radially outwardly of the perforations of said rear wall, a lint collector and burner housing below one side of said drum and having a burn damper for selectively restricting flow through said housing, a front duct having one end in communication with said drum through said perforated front wall and another end connected to said lint collector and burner housing, a paddle wheel blower having its intake connected to said lint collector and burner housing and a supply, a rear duct connected to said panel opening for communication with said drum through said perforated rear wall, a relatively small vent connected at one end to said rear duct and at its other end to the atmosphere, a by-pass damper in said rear duct having a first position for closing said rear duct downstream from said vent and opening said vent and a second position for closing said vent and opening said rear duct, first heating means in said rear duct for drying said clothes, an adsorbent bed casing below the other side of said drum and having a casing inlet connected to said blower supply and a casing outlet in communication with said rear duct, said casing enclosing a pair of horizontal perforated cylinders spaced concentrically and retaining in sandwiched relationship a quantity of silica gel for adsorbing moisture from the air circulating through said drum in contact with said drying clothes, the outer periphery of said outer cylinder being in communication with said casing inlet and the inner periphery of said inner cylinder being in communication with said casing outlet to form a flow path through said silica gel from outside to inside, second heating means in said casing for regenerating said silica gel, and a reversible motor when operated in one direction for selectively rotating said tumbling drum through said one-way clutch and for operating said blower to circulate a first quantity of clothes drying air in a closed circuit including said rear duct, said tumbling drum, said front duct, said lint collector and burner housing and said adsorbent casing and when operated in the reverse direction for disengaging said drum and for operating said blower to circulate a reduced quantity of silica gel drying air from said partial seal means through said casing, and timer control means for actuating said burn damper to a nonrestricting position, said by-pass damper to said second position, said motor for operation in said one direction, and said first heating means for a predetermined period for drying clothes and for subsequently automatically actuating said burn damper to a restricting position, said by-pass damper to said first position, said motor for operation in said reverse direction and said second heating means for a reduced quantity air temperature responsively controlled period for drying said silica gel, whereby said reduced quantity of air entrains moisture from said silica gel and conveys said moisture to the atmosphere through said vent.

2. A clothes dryer including an outer cabinet, a vertical support panel in the rear of said cabinet and having an opening, a tumbling drum having a shaft journaled on said panel, said shaft connected to a one-way clutch for effecting unidirectional rotation of said drum in said cabinet, said tumbling drum having perforated front and rear walls and an imperforate peripheral wall, means for partially sealing between said support panel and said drum radially outwardly of the perforations of said rear wall, a front duct having one end in communication with said drum through said perforated front wall and another end, a paddle wheel blower having its intake connected to said other end of said front duct and a blower supply, a rear duct connected to said panel opening for communication with said drum through said perforated rear wall, a vent connected at one end to said rear duct and at its other end to the atmosphere, a by-pass damper in said rear duct having a first position for closing said rear duct downstream from said vent and opening said vent and a second position for closing said vent and opening said rear duct, first heating means in said rear duct for drying said clothes, an adsorbent bed casing below the other side of said drum and having a casing inlet connected to said blower supply and a casing outlet in communication with said rear duct, said casing enclosing a pair of horizontal perforated cylinders spaced concentrically and retaining in sandwiched relationship a quantity of silica gel for adsorbing moisture from the air circulating through said drum in contact with said drying clothes, the outer periphery of said outer cylinder being in communication with said casing inlet and the inner periphery of said inner cylinder being in communication with said casing outlet to form a flow path through said silica gel from outside to inside, second heating means in said casing for regenerating said silica gel, and a reversible motor when operated in one direction for selectively rotating said tumbling drum through said one-way clutch and for operating said blower to circulate a first quantity of clothes drying air in a closed circuit including said rear duct, said tumbling drum, said front duct and said adsorbent casing and when operated in the reverse direction for disengaging said drum and for operating said blower to circulate a reduced quantity of silica gel drying air from said partial seal means through said casing, and timer control means for actuating said by-pass damper to said second position, said motor for operation in said one direction, and said first heating means for a predetermined period for drying clothes and for subsequently automatically actuating said by-pass damper to said first position, said motor for operation in said reverse direction and said second heating means for a reduced quantity air temperature responsively controlled period for drying said silica gel, whereby said reduced quantity of air entrains moisture from said silica gel and conveys said moisture to the atmosphere through said vent.

3. A clothes dryer including an outer cabinet, a support panel in the rear of said cabinet and having an opening, a tumbling drum having a shaft journaled on said panel, said shaft connected to a one-way clutch for effecting unidirectional rotation of said drum in said cabinet, said tumbling drum having perforated front and rear walls and a substantially imperforate peripheral wall, means for partially sealing between said support panel and said drum radially outwardly of the perforation of said rear wall, a front duct having one end in communication with said drum through said perforated front wall and another end, a paddle wheel blower for circulating air and having its intake connected to said other end of said front duct and a blower supply, a rear duct connected to said panel opening for communication with said drum through said perforated rear wall, a vent connected at one end to said rear duct and at its other end to the atmosphere, a by-pass damper in said rear duct having a first position for closing said rear duct downstream from said vent and opening said vent and a second position for closing said vent and opening said rear duct, first heating means in heat exchange relationship to the air circulated by said blower for drying said clothes, an adsorbent bed casing having a casing inlet connected to said blower supply and a casing outlet in communication with said rear duct, said casing enclosing a quantity of adsorbent material interposed between said casing inlet and said casing outlet in air flow intercepting relationship for adsorbing moisture from the air circulating through said drum in contact with said drying clothes, second heating means in heat exchange relationship to said adsorbent material for regenerating said adsorbent material, and a reversible motor when operated in one direction for selectively rotating said tumbling drum through said one-way clutch and for operating said blower to circulate a first quantity of clothes drying air in a closed circuit including said rear duct, said tumbling drum, said front duct and said adsorbent casing and when operated in the reverse direction for disengaging said drum and for operating said blower to circulate a reduced quantity of adsorbent material drying air from said partial seal means through said casing, and timer control means for actuating said by-pass damper to said second position, said motor for operation in said one direction, and said first heating means for a predetermined period for drying clothes and for subsequently automatically actuating said by-pass damper to said first position, said motor for operation in said reverse direction and said second heating means for a reduced quantity air temperature responsively controlled period for drying said adsorbent material, whereby said reduced quantity of air entrains moisture from said adsorbent material and conveys said moisture to the atmosphere through said vent.

4. A clothes dryer including a cabinet, a tumbling drum in said cabinet having a drum inlet and a drum outlet, a shaft journaled in said cabinet for rotatably supporting said drum, said shaft connected to a one-way clutch for effecting unidirectional rotation of said drum in said cabinet, means for partially sealing between said cabinet and said drum around said drum inlet, a first duct having one end in communication with said drum through said drum outlet and another end, a paddle wheel blower for circulating air and having its intake connected to said other end of said first duct and a blower supply, a second duct connected to said drum inlet for communication with said drum, a vent connected at one end to said second duct and at its other end to the atmosphere, a by-pass damper in said second duct having a first position for closing said second duct downstream from said vent and opening said vent and a second position for closing said vent and opening said second duct, first heating means in heat exchange relationship to the air circulated by said blower for drying said clothes, an adsorbent bed casing having a casing inlet connected to said blower supply and a casing outlet in communication with said second duct, said casing enclosing a quantity of adsorbent material interposed between said casing inlet and said casing outlet in air flow intercepting relationship for adsorbing moisture from the air circulating through said drum in contact with said drying clothes, second heating means in heat exchange relationship to said adsorbent material for regenerating said adsorbent material, and a reversible motor when operated in one direction for selectively rotating said tumbling drum through said one-way clutch and for operating said blower to circulate a first quantity of clothes drying air in a closed circuit including said second duct, said tumbling drum, said first duct and said adsorbent casing and when operated in the reverse direction for disengaging said drum and for operating said blower to circulate a reduced quantity of adsorbent material drying air from said partial seal means through said casing, and timer control means for actuating said by-pass damper to said second position, said motor for operation in said one direction, and said first heating means for a predetermined period for drying clothes and for subsequently automatically actuating said by-pass damper to said first position, said motor for operation in said reverse direction and said second heating means for a reduced quantity air temperature responsively controlled period for drying said adsorbent material, whereby said reduced quantity of air entrains moisture from said adsorbent material and conveys said moisture to the atmosphere through said vent.

References Cited in the file of this patent

UNITED STATES PATENTS

| | | |
|---|---|---|
| 1,545,395 | Carroll | July 7, 1925 |
| 2,066,847 | McShea | Jan. 5, 1937 |
| 2,115,226 | Kopp | Apr. 26, 1938 |
| 2,590,295 | Constantine | Mar. 25, 1952 |
| 2,750,680 | Houdry et al. | June 19, 1956 |
| 2,758,390 | Munters | Aug. 14, 1956 |
| 2,773,313 | O'Connor | Dec. 11, 1956 |
| 2,809,025 | Pettyjohn | Oct. 8, 1957 |
| 2,830,385 | Smith | Apr. 15, 1958 |
| 2,913,832 | Kaufman | Nov. 24, 1959 |
| 2,925,664 | Cobb et al. | Feb. 23, 1960 |

FOREIGN PATENTS

| | | |
|---|---|---|
| 620,906 | Great Britain | Mar. 31, 1949 |